United States Patent
Wilhelm

(10) Patent No.: US 11,925,959 B2
(45) Date of Patent: Mar. 12, 2024

(54) APPARATUS AND METHOD FOR DE-DUSTING BULK MATERIALS

(71) Applicant: HELIOS GERÄTEBAU FÜR KUNSTSTOFFTECHNIK GMBH, Rosenheim (DE)

(72) Inventor: Klaus Wilhelm, Rosenheim (DE)

(73) Assignee: HELIOS GERÄTEBAU FÜR KUNSTSTOFFTECHNIK GMBH, Rosenheim (DE)

( * ) Notice: Subject to any disclaimer, the term of this patent is extended or adjusted under 35 U.S.C. 154(b) by 344 days.

(21) Appl. No.: 17/280,145

(22) PCT Filed: Aug. 26, 2019

(86) PCT No.: PCT/EP2019/072710
§ 371 (c)(1),
(2) Date: Sep. 27, 2021

(87) PCT Pub. No.: WO2020/069798
PCT Pub. Date: Apr. 9, 2020

(65) Prior Publication Data
US 2022/0008958 A1    Jan. 13, 2022

(30) Foreign Application Priority Data

Oct. 1, 2018 (DE) .......................... 102018124207.7

(51) Int. Cl.
*B07B 4/02* (2006.01)
(52) U.S. Cl.
CPC ...................... *B07B 4/02* (2013.01)
(58) Field of Classification Search
CPC ................ B07B 4/02; B07B 4/00; B29B 9/16
(Continued)

(56) References Cited

U.S. PATENT DOCUMENTS

2008/0223759 A1    9/2008 Schneider et al.

FOREIGN PATENT DOCUMENTS

| CN | 1077907 A | 11/1993 |
| CN | 1868843 A | 11/2006 |

(Continued)

*Primary Examiner* — Gene O Crawford
*Assistant Examiner* — Muhammad Awais
(74) *Attorney, Agent, or Firm* — Head, Johnson, Kachigian & Wilkinson, PC

(57) ABSTRACT

In batchwise operation, the granulate grains (4) are filled into the dedusting container (9), which has no closure element at the lower granule outlet opening (25) and in which the whirling nozzles (31) for introducing compressed air are arranged in a lower cone (28), and—in particular depending on the filling level in the intermediate container (14) below—are filled into the dedusting container (9) either dropped downwards without counterflow (32), dedusting being effected by conveying out the introduced air, optionally due to the negative pressure at the upper air outlet opening, whereby only freely suspended dust particles are sucked off
or already during the filling process a counterflow (32) is introduced, which partially does not allow the filled granulate grains (4) to fall through the granulate outlet opening (25) but holds them quasi floating at the level of the lower third or lower quarter of the dedusting container (9).
By controlling the counterflow (32), the height of the reversal area (30) of the highly turbulent granulate grains (4) and also the residence time of the granulate grains (4) in the dedusting container (9) can be controlled, so that the device can also be operated in continuous operation.

26 Claims, 9 Drawing Sheets

(58) Field of Classification Search
USPC .......................................................... 209/133
See application file for complete search history.

(56) References Cited

FOREIGN PATENT DOCUMENTS

| | | | | | |
|---|---|---|---|---|---|
| CN | 101939235 | A | | 1/2011 | |
| CN | 102416359 | A | | 4/2012 | |
| CN | 202638755 | U | | 1/2013 | |
| CN | 104096434 | A | | 10/2014 | |
| CN | 104474825 | A | | 4/2015 | |
| CN | 104587780 | A | | 5/2015 | |
| CN | 107648975 | A | | 2/2018 | |
| CN | 107922111 | A | | 4/2018 | |
| DE | 102007047119 | A1 | * | 4/2009 | ............... B07B 7/01 |
| DE | 102014113280 | A1 | * | 3/2016 | ............... B07B 4/08 |
| DE | 102016119827 | A1 | | 4/2018 | |
| DE | 102016119827 | A1 | * | 4/2018 | ............. B07B 11/04 |
| EP | 2045199 | | | 10/2008 | |
| EP | 2045199 | A1 | * | 4/2009 | ............... B07B 7/01 |
| EP | 2607274 | A1 | * | 6/2013 | ............. B65G 53/14 |
| EP | 2711097 | A1 | * | 3/2014 | ............... B07B 4/00 |
| GB | 715601 | | | 9/1954 | |
| JP | 2004033885 | A | * | 2/2004 | |
| JP | 2013248578 | A | * | 12/2013 | |
| KR | 101170939 | B1 | * | 8/2012 | |
| RU | 2321463 | C1 | * | 4/2008 | ............. B03C 3/017 |
| WO | WO2016041968 | | | 3/2016 | |
| WO | WO2018073053 | | | 4/2018 | |

* cited by examiner

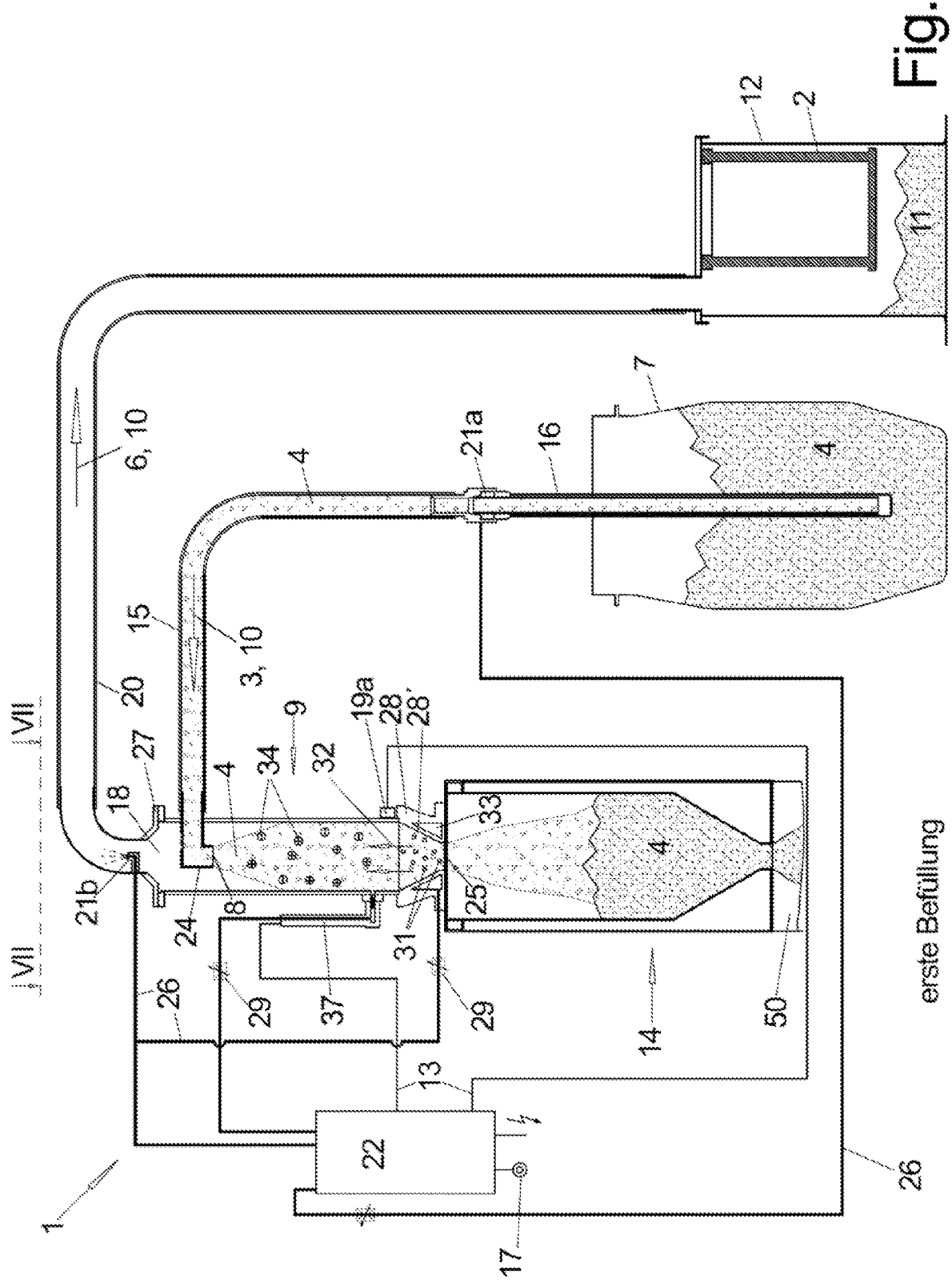

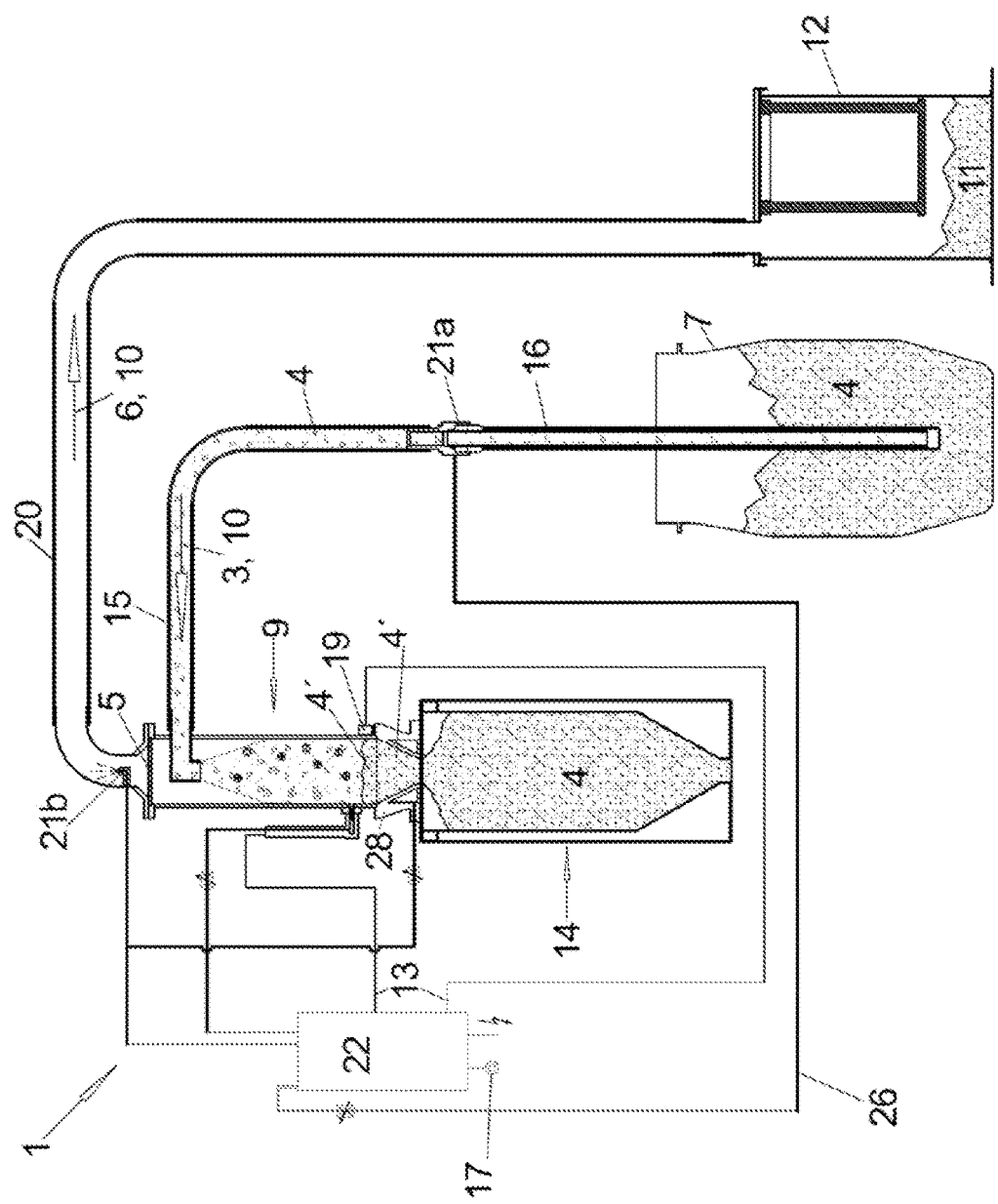

Figure 3:
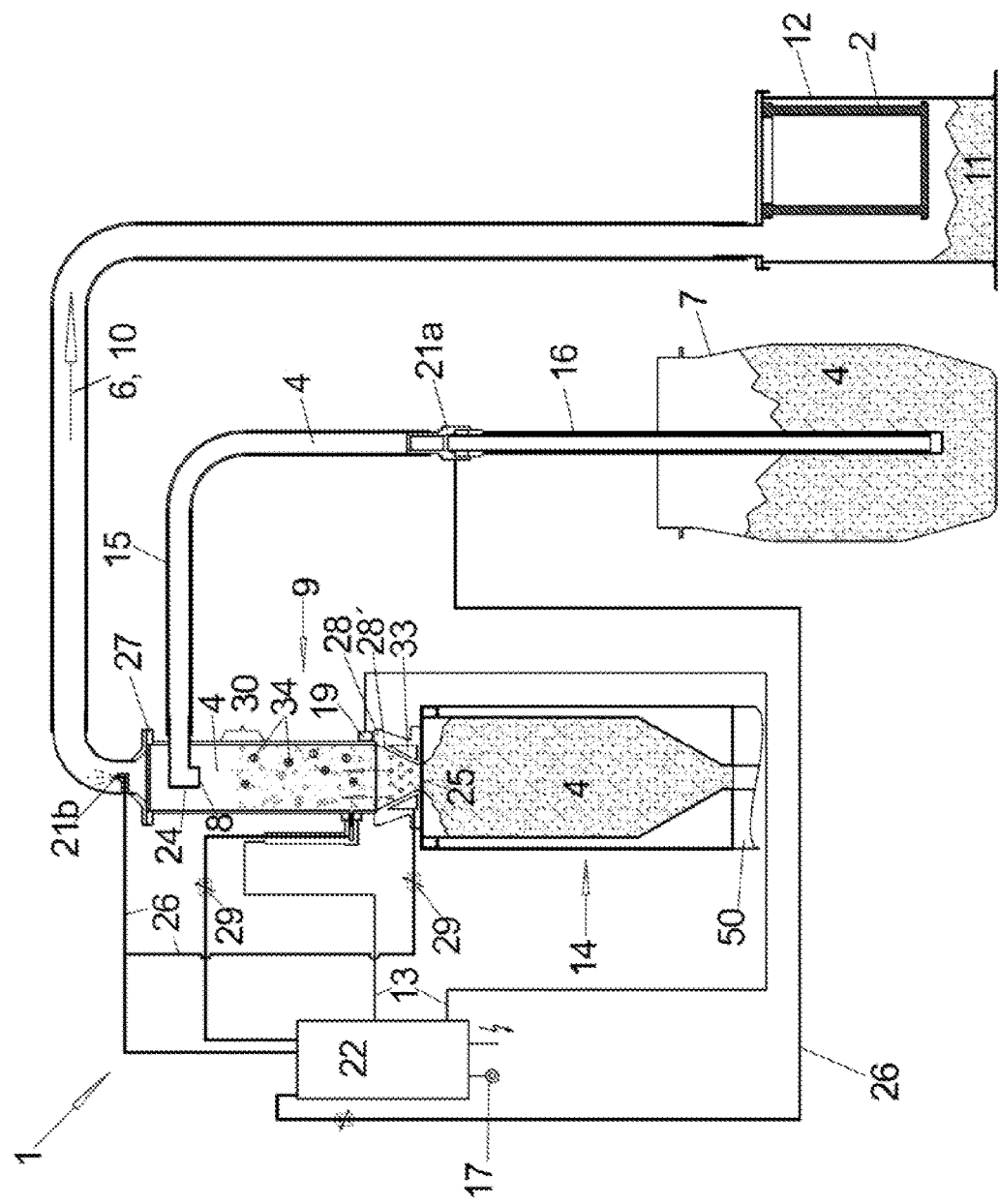

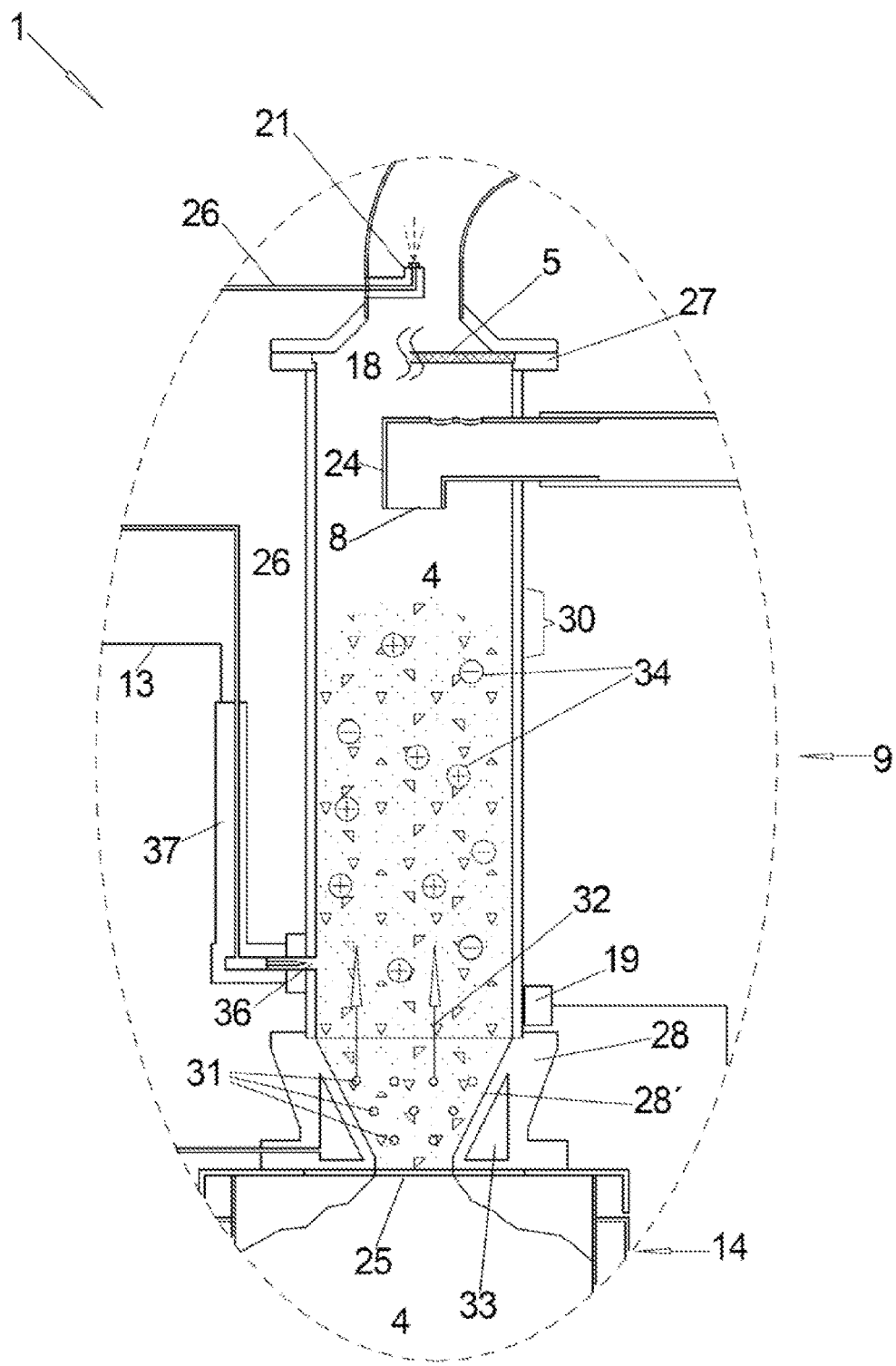
windsichten Charge      Fig. 3.1

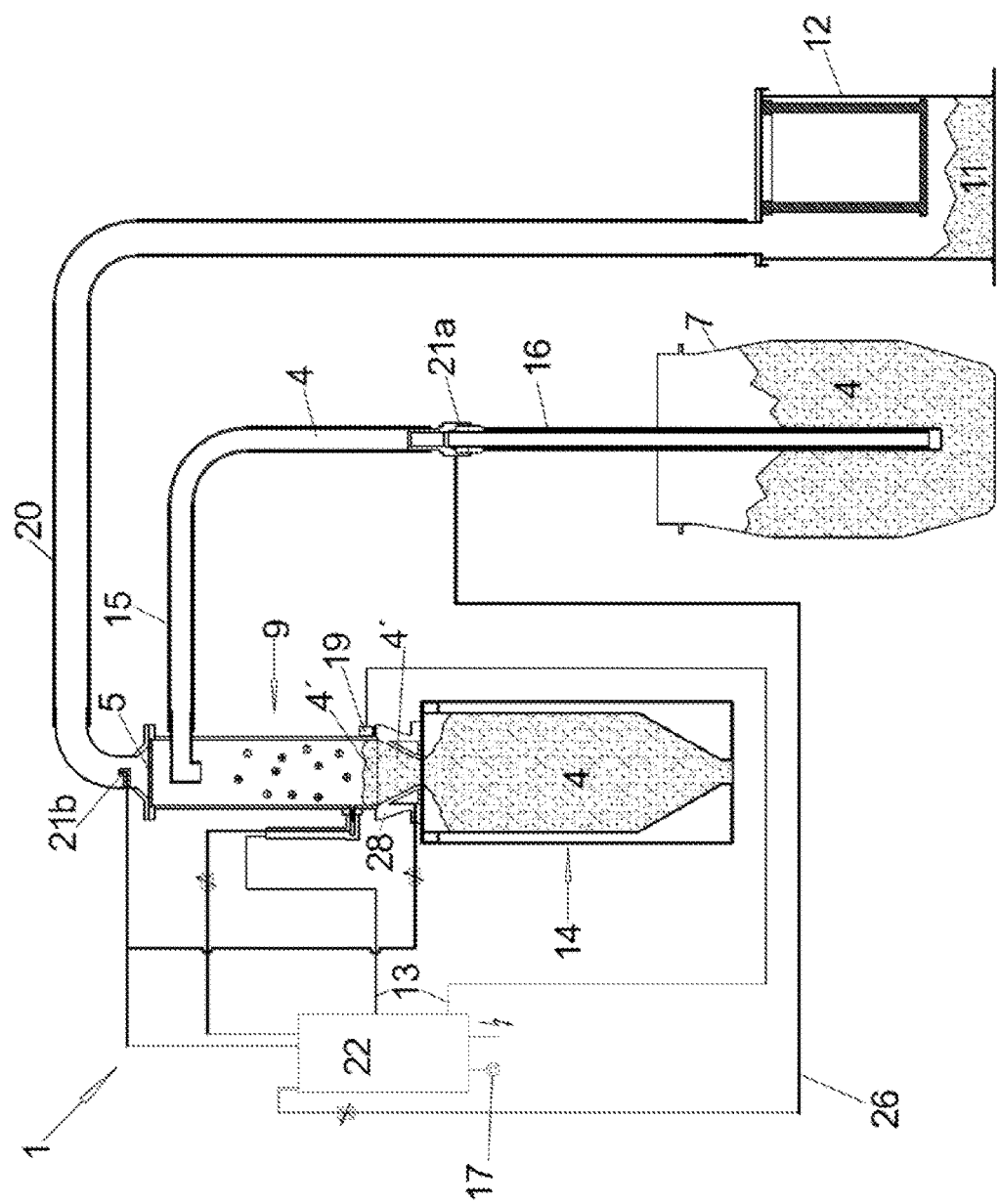

APPARATUS AND METHOD FOR DE-DUSTING BULK MATERIALS

I. FIELD OF APPLICATION

The invention concerns the removal of the dust contained in bulk materials, in particular by means of ionization, whereby the dust often adheres to the granulate grains by means of electrostatic charging.

II. TECHNICAL BACKGROUND

Especially in plastics technology, but also in pharmaceutical and food technology, raw materials in the form of bulk materials—such as granulates, ground materials, coarse powders, etc.—often have to be handled. For the purposes of this notification, all bulk materials are designated by the abbreviating term 'granulate'.

Especially the transport of these bulk materials is often carried out by means of pneumatic conveying, in particular by means of flight conveying, in which the granulate is brought to the desired location by means of air flow and, for the most part, flying with it through conveyer pipes.

The granulate should be as clean as possible for further processing, for example for use as raw material in a plastic injection moulding machine, and in particular should not be contaminated with dusty impurities. These dust impurities may consist of foreign material which was unintentionally added to the granulate during manufacture or transport, or they may also be dust particles of the same material as the granulate itself, which may also be undesirable depending on the subsequent use.

Dust or dust impurities within the meaning of this description should preferably have a particle size of not more than $1/10$, better not more than $1/30$, better not more than $1/100$, better not more than $1/1000$ of the diameter of a granule grain.

Therefore, the general aim is to separate such granulates from the dust content before use.

Various techniques are available for this purpose, from simple sieving to separating the transport air from granulate and filtering the transport air to fraction separation by means of a cyclone.

One of the problems encountered is the strong adhesion of dust particles and granulate particles to each other, but also the adhesion of dust particles to device parts such as conveyor lines or granulate containers.

This strong adhesion is often caused by electrostatic charging, so that the dust can usually only be removed with mechanical measures once these binding forces have been removed.

In principle, this is known to be possible because the differently charged and thus attracted parts, in this case dust particles on the one hand and granulate particles on the other hand, are each statically discharged, for example by grounding one fraction.

However, with a very large number of very small particles, as in the present case, this is difficult in practice.

For example, attempts have already been made to separate the granulate by constantly whirling it up in the deducting container closed at the bottom and to bring it into intimate contact with ionised air. However, this can cause further abrasion and thus dust simply by the collision of granulate grains.

In addition, an attempt was made to suck the dust-laden air out of the granulate container via an air outlet opening and not to push it out by means of excess pressure, whereby the air outlet opening was closed by a sieve which could not penetrate a granulate grain.

III. PRESENTATION OF THE INVENTION a) Technical Object

It is therefore the task according to the invention to provide a device for dedusting a granulate, which is very compact and lightweight, inexpensive to manufacture due to as few individual parts as possible and therefore works very reliably, as well as a method for operating such a device, which is very variable.

b) Solution of the Object

This object is solved by the features of claims 1 and 14. Advantageous solutions result from the subclaims.

With regard to the method, this is achieved by generating a known counterflow in the dedusting container, directed from bottom to top, which is strong enough to move granulate grains—which in the state of the art have been placed as a charge on the closed closure element forming the bottom of the dedusting container—upwards with the counterflow and thus to separate them.

Particularly when the flow velocity of the counterflow decreases with height—which is the case, for example, when the cross-section of the airflow increases upwards—the force acting upwards on the granulate grains decreases until gravity prevails, and the granulate grains end their rise in a reverse zone occurring at a certain height and—as a rule, outside the cross-section of the airflow or at its edge—sink back into the granule collection.

From there, they can get back into the counter-flow and do this cycle several times, depending on how long the air flow is maintained.

As is well known, this separation enables the dust particles to be extracted from the granulate—even if they still adhere slightly to the granulate grains—upwards by means of a corresponding negative pressure, above all in or above the reverse zone.

A distinction must first be made between batch operation and continuous operation.

In the state of the art, the dedusting of a granulate, in particular of a pneumatically conveyed granulate, was carried out in batches, i.e. the granulate outlet opening at the lower end of the dedusting container was closed, a batch of granulate was filled into the dedusting container up to a specified filling level and then the granulate was conveyed upwards by, for example, whirling up the granulate by means of the counterflow directed against gravity and outward conveyance, in particular suction of the dust-laden air, but without the granulate grains.

Also an ionization of the air in the dedusting container is already known.

Then, by opening the closing element of the granulate outlet opening, the de-dusted granulate was dropped into the intermediate container underneath.

In accordance with the invention, the lower granulate outlet opening is not closed by a closing element of the device such as a closing flap during batchwise operation even during the filling process, so that such a flap is also preferably not present at all.

If no counterflow is generated during the filling process, the granulate grains fall down to the surface of the granulate fill in the intermediate container usually located below, whereby this surface can also be at the level of the lower granulate outlet opening of the dedusting container or even slightly above it, i.e. already in the dedusting container.

Only minor dedusting takes place due to the pressing out or sucking out of the air introduced into the dedusting container, preferably by means of an adjacent negative pressure, through which, however, only dust particles suspended freely in the air are sucked out.

If the surface of the fill in the intermediate container is very high or has already reached the dedusting container, the newly filled batch already collects in the dedusting container and can then be better dedusted by whirling up.

Preferably, however, there is already a counterflow during the filling process. The structured method according to the invention therefore consists of the following preferentially steps A) with or without counterflow (32) granulate (4) is filled into the dedusting container (9) up to a predetermined filling level, B) the filling process is terminated when the filling level is reached, C) the dedusting of the filled charge (4') in the dedusting container (9) is carried out by means of introduced ionized gas, in particular ionized air, and whirling up the granule grains (4) by means of a counterflow (32) and conveying out, in particular suctioning out, the dust-laden gas, D) the dedusting container (9) is cleaned by flushing with an ionised gas, in particular ionised air, E) after the filling level has fallen below the specified level, at least steps A) to C) and E) can be carried out again, The force of the counter-flow, i.e. its flow velocity and/or its volume flow and/or pressure, is preferably controlled in step A) in such a way that the majority of the granulate is held above the granulate outlet opening, i.e. floats, so to speak, without being whirled up significantly.

Majority means that it is more than 70 percent by volume, better than 80 percent by volume, better than 90 percent by volume, better than 95 percent by volume, better than 98 percent by volume.

In this context, not significantly whirling means that the majority of the granulate grains are not whirled up above the height of the lower quarter, in particular not above the height of the lower third, of the dedusting container.

The counterflow should not be so strong that the pressure in the dedusting container at the granulate inlet opening is greater than the pressure in the filler neck for the granulate, otherwise the filling process would be interrupted.

As a rule, the upward counterflow is generated by the injection of compressed air, but a weak counterflow can also be achieved by the flow of ionised gas, in particular ionised air.

The whirling up in step C) can also be carried out several times in succession by short compressed air shocks.

After completion of the filling process, the charge introduced into the dedusting container is further deducted by whirling the granulate grains mainly high but not so high that they reach the upper air outlet opening, preferably also not the possibly still below arranged inlet stub.

The granulate outlet opening therefore preferably remains permanently open, which means that there is no closure element as part of the device that can close the granulate outlet opening.

If the granulate is piled up downstream of the granulate outlet opening, e.g. from the downstream intermediate container, through the granulate outlet opening, the latter can be partially or completely closed, but not by a tightly closing closure element, which is part of the device. This allows the permeability of the granulate outlet opening to be controlled more or less steplessly by changing the counterflow.

The granulate grains are transported from the storage container into the dedusting container by means of overpressure.

On the other hand, the dust-laden air, preferably upwards, can be removed from the dedusting container by means of suction air, the suction effect of which, however, is set in such a way that it cannot remove any granulate grains from the air outlet opening, even if there is no sieve to retain the granulate grains.

Preferably, the high turbulence by shooting in compressed air and the suction of the dust-laden air from the dedusting container by means of suction air always only takes place simultaneously.

However, it is not possible to suck the granulate through the dedusting container from the storage container by means of a vacuum source arranged downstream of the dedusting container, since this vacuum source would draw false air through the always open granulate outlet opening and would not draw any granulate out of the storage container.

In step A) and/or C), the strength of the counterflow is controlled so that the granulate grains do not reach the upper air outlet opening and/or the filler neck.

When the dedusting is finished, the flow is reduced or completely switched off so that the granulate grains fall downwards and, depending on the filling level in the intermediate container below, fall into the intermediate container.

An important advantage of the solution according to the invention is also the fact that dust can also be removed during continuous operation by a) granulate (4) is continuously filled into the dedusting container (9) according to the consumption of granulate (4) from the dedusting container (9), b) the granulate grains (4) are simultaneously deducted in the dedusting container (9) by means of introduced ionized gas, in particular ionized air, and the granulate grains (4) are swirled up by a counterflow (32) and conveyed out, in particular sucked out, of the dust-laden gas c) wherein the average residence time of the granulate grains (4) in the dedusting container (9) is determined by controlling the force of the counterflow (32).

Both in batch operation and in continuous operation, the force of the counter-flow, in particular the flow velocity and/or the volume flow of the counterflow can also be influenced by controlling the height up to which the granulate is whirled up in the dedusting container.

The filling process only has to be interrupted in continuous operation if the consumption of granulate downstream of the dedusting container is less than the quantity of granulate supplied per time unit through the supply line, i.e. in particular the intermediate container under the dedusting container is completely filled and its filling into the dedusting container would increase. A permissible upper limit of the filling level in the intermediate container could be constantly checked.

This can result in a granulate grain that has just fallen out of the filler neck, i.e. the granulate inlet opening, into the dedusting container immediately falling through the granulate outlet opening downwards into the intermediate container without being moved upwards a single time, and then the dust particles adhering to this granulate grain are not yet completely removed. However, the statistical probability that this will happen is relatively low.

The inventive method therefore represents a compromise—both in batchwise and in continuous operation—between low-cost dust removal in terms of manufacturing costs for the device and energy costs for the compressed air supply and an optimum dust removal result.

The ionization of the air both in batchwise and in continuous operation in the dedusting container is carried out in such a way that the ionization tip of an ionizer is in contact with the interior of the dedusting container.

It is possible to switch between batch operation and continuous operation, i.e. both operating modes can be operated with the same device if the controller contains both operating modes.

The ionization tip is preferably surrounded by a gas, in particular air, introduced into the dedusting container, which ionizes the passing air flowing into the container. The ionization tip is preferably located in the mouth of such a gas supply line. This is a particularly efficient way of ionizing the air to be introduced.

Ionised gas, in particular ionised air, can be introduced at several points:
  in the lower area of the dedusting container through its peripheral wall, especially just above the granulate outlet opening, especially just above the outlet cone, and/or
  through a separate gas supply opening, i. e. not combined with the whirling nozzles, either in the outlet cone or at its lower end, i.e. at the level of the granulate outlet opening or even below n the intermediate container and/or
  through the wall of an intermediate container located under the dedusting container.

This ensures that the counterflow generated by the turbulence nozzles contains as much ionized air as possible.

A special case, especially in batchwise operation, is the beginning of the dedusting of a larger quantity of granulate:

Then the intermediate container under the deducting container is still empty, and only fills up with each dedusted batch that has fallen down into the intermediate container.

In normal operation, the intermediate container is filled up to the granulate outlet opening. The new batch to be dedusted can then be filled into the dedusting container and sits on the surface of the granulate in the intermediate container so that a counterflow does not necessarily have to be generated during the filling process.

However, if the intermediate container is not filled to the granulate outlet opening, this is usually essential, as otherwise the freshly filled granulate particles will immediately fall into the intermediate container.

After the dedusting and/or emptying of the dedusting container, in which the dedusted charge has fallen into the intermediate container, the dedusting container is rinsed with ionized air in accordance with step D), wherein preferably a multiple of the volume of the interior space of the dedusting container is introduced in ionized air and pressed beyond the air outlet opening or sucked off, and in the process dust particles adhering to the inner circumferential surfaces of the dedusting container are removed or adhering granulate grains are dissolved.

In order to carry out a dedusting method, in particular the one described above, a device is required which first of all—as is known for batchwise dedusting—has a dedusting container which has at least one granulate inlet opening and one granulate outlet opening as well as an air outlet opening for removing, in particular extracting, the air together with the dust to be removed.

The granulate inlet opening and/or the air outlet opening shall preferably be located in the upper part, especially in the upper half or in the upper third, of which the air outlet opening shall preferably be in the upper lid of the dedusting container. The granulate outlet opening, on the other hand, will be located in the lower area, especially in the lower third or preferably in the bottom of the granulate dedusting container.

Furthermore, a well-known dedusting device comprises a whirling unit for whirling up the granulate in the dedusting container by injecting compressed air, as well as a controller, in particular an electronic controller, which is capable of controlling the entire device, in particular all movable parts, in particular valves and/or all pneumatically or electrically or electronically functioning parts of the device.

According to the invention, however, there is no activatable and deactivatable closure element at the granulate outlet opening, so that it is permanently open. This considerably simplifies the installation and maintenance of the device.

Furthermore, the peripheral walls surrounding the dedusting container are made of an electrically non-conductive material, in particular glass, at least on the inner surfaces facing the interior. This means that ionised air molecules which are introduced into the dedusting container to electrically neutralise electrostatically charged dust particles and which come into contact with the inner surfaces are not neutralised immediately. Preferably, the peripheral walls of the dedusting container consist entirely of glass, in particular one piece of a cylindrical glass tube.

The whirling unit comprises upwardly directed whirling nozzles which are connected to a compressed air connection and are arranged in the lower part of the dedusting container close to the granulate outlet opening, preferably in an outlet cone forming the lower part of the dedusting container, the cross-section of which decreases downwards and which may consist of metal.

This allows the counterflow generated by the whirling nozzles to widen from bottom to top above the granule outlet opening in the area of the outlet cone, whereby the flow velocity automatically decreases with increasing widening until it is too low at a certain height, the so-called reverse zone, to move granulate grains against gravity or to maintain them at a constant height.

By controlling the pressure applied to the whirling nozzles and/or the volume flow through the nozzles, it is possible to control how strongly and how high the granulate present above the whirling nozzles is whirled up in the dedusting tank.

The whirling nozzles are designed and supplied with compressed air in such a way that they can generate a counterflow that keeps the granulate grains floating in at least one position above the granule outlet by whirling them up.

Preferably, the ionizer used has an ionization tip which is arranged in the free end region of a gas supply line, in particular an air supply line, and projects into an opening in the wall of the dedusting container or even through it into the interior of the dedusting container. The ionizer is preferably located on the outside of the wall of the dedusting container. Preferably only one ionizer is present.

A gas supply opening, in particular an air supply opening, may be provided in the lower part of the dedusting container, in particular above the outlet cone. The air introduced via the turbulence nozzles can also be ionized upstream of the turbulence nozzles by an ionizer. This allows the interior of the dedusting container to be optimally flooded with ionized air.

The air outlet opening is preferably completely open and in particular not covered by a screen. This avoids clogging the sieve with dust or angel hair.

The negative pressure downstream of the air outlet opening is controlled so that it is not able to suck granulate grains into the air outlet opening.

For this purpose, the dedusting container has a height of at least 100 mm, better at least 200 mm, better at least 300 mm, better at least 400 mm, so that the granulate whirling up can be stopped at a sufficient distance below the air outlet, i.e, the reverse zone of the highly whirled granulate grains still lies a sufficient distance above the lower granulate outlet opening which is sufficient to electrically neutralise the dust adhering to the granulate grains and to remove it from the granulate grains.

The dust-laden air, which is forced out or sucked out through the air outlet opening, is fed to a dust separator, in particular a filter, which can also be located far away from the dedusting container.

A vacuum generator, for example a so-called compressed air ejector nozzle, is preferably provided between the air outlet opening and the dust separator, or a vacuum generator, in particular also a blower, downstream of the dust separator. Compressed air is introduced into such a generally known compressed air ejector nozzle, which thereby carries the surrounding air with it and generates a negative pressure upstream of the compressed air ejector nozzle and an overpressure downstream.

The device comprises a flow generator arranged in the supply line for granulate grains in the form of a known compressed air ejector nozzle, which is arranged in the free end area of the supply line, which can be designed in the form of a suction lance. There, the granulate grains are sucked into a storage container and conveyed from the conveyor flow generator to the dedusting container with overpressure in the conveyor line.

Preferably an intermediate container is arranged below the granulate outlet opening of the dedusting container into which the granulate can fall through the granulate outlet opening.

The device comprises a level sensor, preferably only one, in the dedusting container and/or in the intermediate container.

In order to also be able to produce granulate mixtures from two components, two suction lances for different storage containers can be connected to the dedusting container via one conveying capacity each, which either end in two separate granulate inlet openings in the dedusting container or whose conveyer pipes are combined outside the dedusting container to form a single conveyer pipe and granulate inlet opening.

C) EMBODIMENT CONTAINERS EXAMPLES

Figure 5:
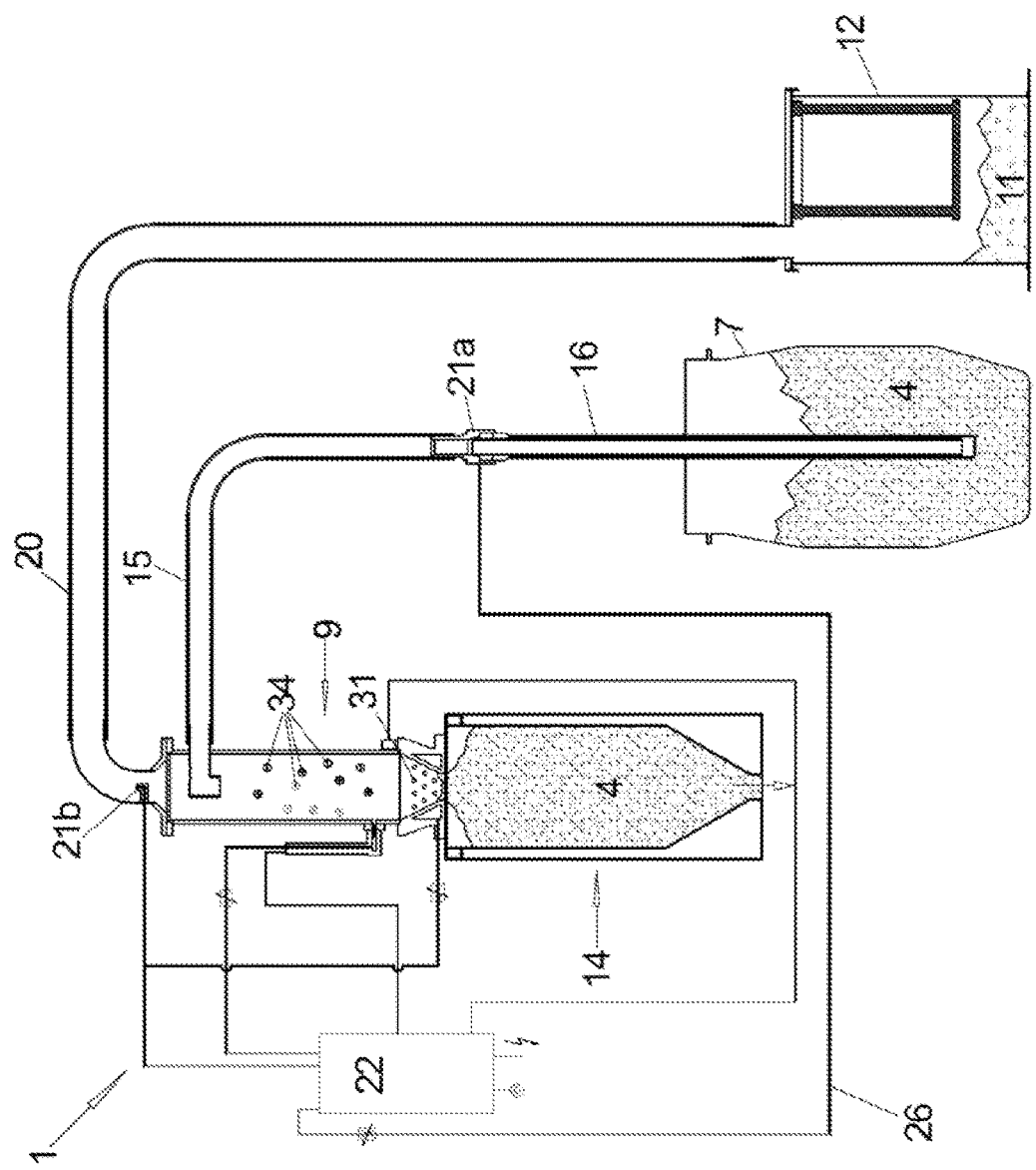
Figure 6:
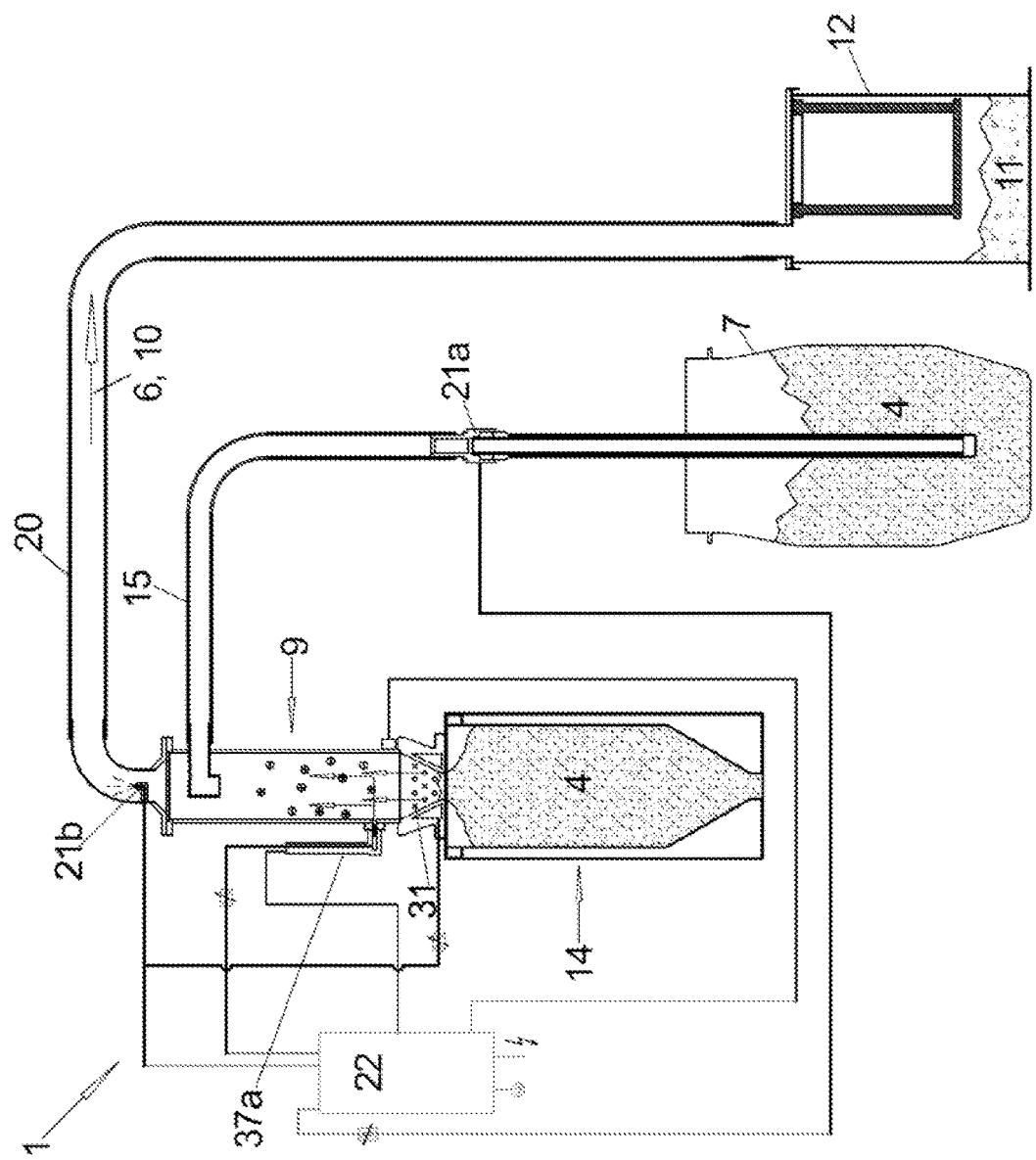
Figure 7:
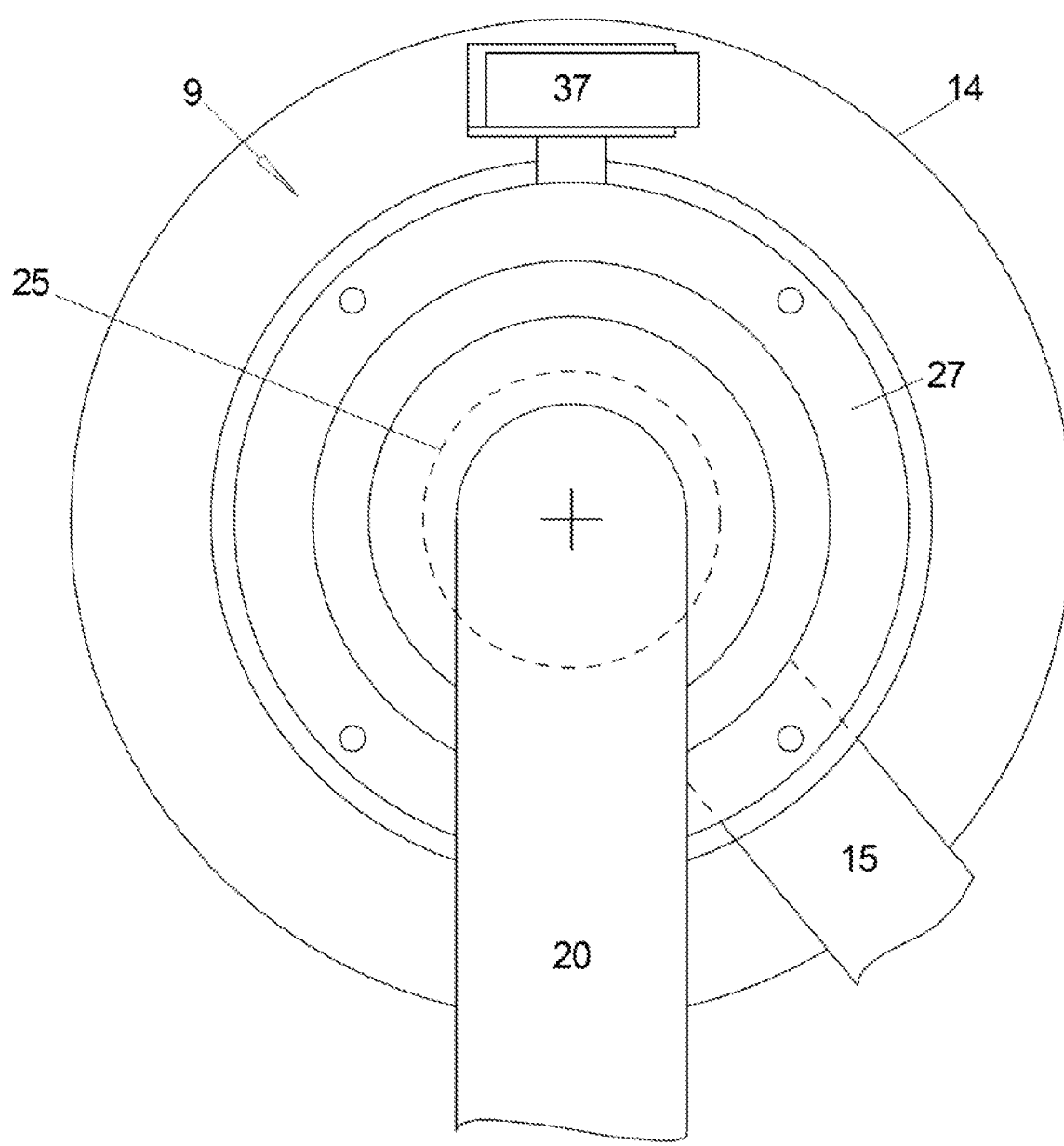

A design of a device for removing dust from a granulate according to the invention is described in the following exemplarily on the basis of the figures in different functional states. The figures show:

FIGS. 1a, b: the device for the first filling of the intermediate container, shown in the side view, partly in vertical section, FIG. 2: the device during filling of the dedusting container, shown in the side view, partly in vertical section FIG. 3: the device for dedusting the granulate contained in the dedusting container, FIG. 3.1 an enlargement from FIG. 3, FIG. 4: the device at the end of the dedusting process, FIG. 5: the device for emptying the dust container, FIG. 6: the device when flushing the empty dust collector, FIG. 7: a view from above onto the dedusting container.

Dedusting of granulate 4 is carried out in batches or continuously in the dedusting container 9.

At first the batchwise operation is explained.

During batchwise operation, the dedusting container 9 is first filled with a batch 4' of granulate 4 as shown in FIG. 2, whereby the intermediate container 14, which is open at the top and is arranged under the dedusting container 9 and its lower granulate outlet opening 25, is filled up to the granulate outlet opening 25, so that the batch 4' newly introduced into the dedusting container 9 can deposit on the upper side of the fill of the intermediate container 14 of granulate 4 and is supported by this.

For this purpose, a suction lance 16 is inserted in a storage of granulate 4, which is located in a storage container 7. Via the conveyer pipe 15 connected to the suction lance 16, which ends with its other end in an inlet stub 24, the free open end of which, the granulate inlet opening 8, is located in the dedusting container 9, the granulate is pressed from the storage container 7 to the dedusting container 9 by means of the conveying air 3 flowing in the direction of flow 10, which entrains the granulate grains 4 to the dedusting container 9. This is achieved by means of a compressed air operated ejector compressed air nozzle 21a in or near the suction lance 16.

The inlet stub 24 here is an angled pipe section which runs through the wall of the dedusting container 9 in a sealed manner and whose free end points downwards in the dedusting container 9, so that the granulate 4 fed via the conveyer pipe 15 flows downwards out of the granulate inlet opening 8 and remains lying on the upper side of the fill of the intermediate container 14 in the height region above the granulate outlet opening 25, approximately in the height region of the outlet cone 28 and slightly beyond that to the height position of the filling level sensor 19a, which triggers the switching off of the delivery of granulate 4. Then the compressed air supply to the ejector compressed air nozzle 21a in the suction lance 16 is terminated.

During the filling process, the conveying air 3 leaves the dedusting container 9 via its air outlet opening 18, which is located in the lid 27 of the dedusting container 9 and which can be spanned by a screen 5, through which the conveying air 3 and any dust 11 contained in it can flow, but not granulate grains 4.

From there the conveying air 3, now exhaust air 6, flows in flow direction 10 along a dust pipe 20 to a dust collection container 12 and through an exhaust air filter 2, which is preferably arranged in an outlet opening in the lid of the dust collection container 12 and which is not permeable for the dust 11.

The flow of the exhaust air 6 is optionally effected or at least intensified by a vacuum generator downstream of the air outlet opening 18, in this case again an ejector compressed air nozzle 21b, which is either already arranged directly downstream of the air outlet opening 18 in the dust pipe 20 or can also only be arranged downstream of the exhaust air filter 2.

Such an ejector compressed air nozzle 21a, b shoots compressed air usually taken from an existing stationary compressed air network 17—in the desired flow direction 10 into the respective transport pipe, and thereby generates a negative pressure in the transport pipe upstream of the ejector compressed air nozzle 21 and thus a flow of the transport air in this flow direction 10.

In the sectional view of FIG. 1a to 6 and from the view of FIG. 7 it becomes clear that the dedusting container 9 is an upright, essentially cylindrical container, i.e. with rotationally symmetrical inner circumferential walls, which approach one another in the lower region to the granulate outlet opening 25, preferably arranged centrally therein, in the form of a cone surface 28'.

The circumferential wall of the cylindrical part of the dedusting container 9 is formed by a tube piece of an electrically non-conductive material, preferably of glass, on the open upper side of which the lid 27 is seated and the open underside of which is seated on the cone 28, in which the inner cone surface 28' is formed. In this cone surface 28', whirl-up nozzles 31 open out, through which compressed air can be injected into the interior of the dedusting container 9 to whirl up the granulate 4 inside, which is made available to the individual components by a controller 22, as are electrical control signals and electrical current.

The outlet cone 28 preferably comprises a ring channel 33 arranged concentrically to the granulate outlet opening 25, which is connected on the one hand to the compressed air source and on the other hand to the whirling nozzles 31.

As FIG. 7 shows, the area of the granulate outlet opening 25, which is in particular circular, may be substantially smaller than the internal free cross-section, which is in particular circular, of the dedusting container 9, and the cross-section of the granulate inlet opening 8, which is in particular circular, the mouth at the end of the inlet stub 24, is in general also smaller than the internal free cross-section, which is in particular circular, of the dedusting container 9, which, however, is by no means a condition for the realisation of the invention.

The batch in the granulate dedusting container 9 is then deducted as shown in FIG. 3 and the enlargement of FIG. 3.1:

For this purpose, a vacuum is optionally first generated in the dust pipe 20, i.e. compressed air is applied to the ejector compressed air nozzle 21b there.

Ionized air is introduced into the dedusting container 9 via the gas inlet opening 36, which is intended to neutralize the static charge of the dust particles 11 as well as the granulate grains 4. In order for this to work well, compressed air is injected into the interior of the dedusting container 9 via the whirling nozzles 31 from the cone walls 28', in particular obliquely upwards, and thus a counterflow 32 directed against gravity is generated, which whirls up and separates the granulate grains 4 as shown in FIG. 3.

Figure 1B:
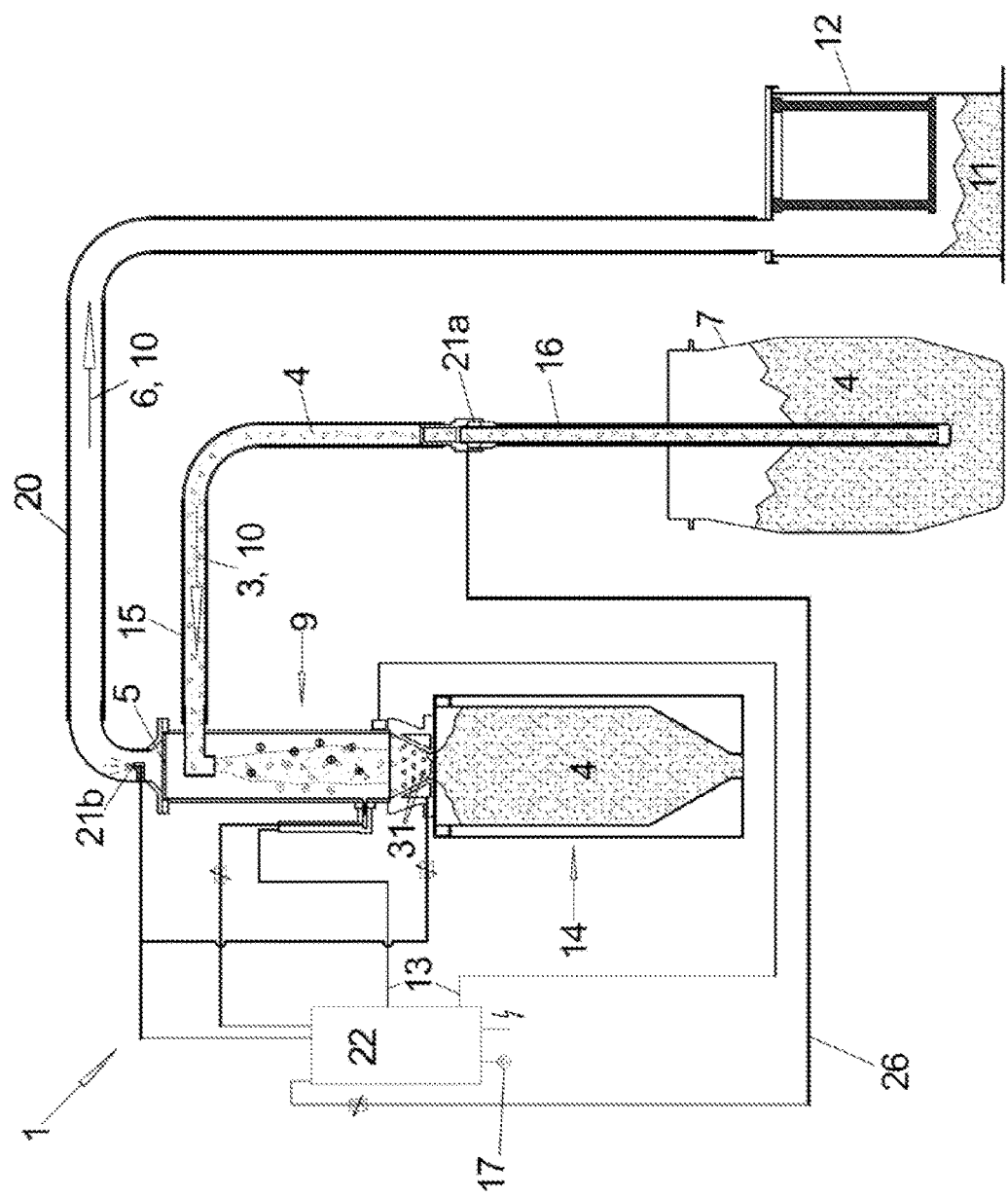

The high turbulence is controlled in such a way that the granulate grains 4 stop their upward movement in a reverse zone 30 and fall down again in the direction of the outlet cone 28, whereby the reverse zone 30 is still below the inlet stub 24, in order to avoid a collision of granulate grains 4 at the inlet stub 24. As a result, the granulate grains 4 do not reach the upper air outlet opening 18 and cannot be sucked into the exhaust air pipe 20 by the negative pressure prevailing there, even if it is not covered by a screen 5 as shown in FIG. 1a, i.e. it is completely open, as shown in FIG. 1b alternatively.

Preferably, the control 22 is used to introduce compressed air into the whirling nozzles 31 coupled with the introduction of compressed air into the compressed air ejector nozzle 21b to generate the negative pressure in the dust pipe 20.

Depending on the duration of the counterflow 32, the granulate grains 4 pass through several such circuits. Preferably, however, the counterflow 32 is switched on and off several times in succession.

The counterflow 32 thus flows through the charge 4', which was previously supported downwards by the top of the bulk material in the intermediate container 14 at approximately the level of the granulate outlet opening 25, and has such a force that most granulate grains 4 do not fall downwards through the granulate outlet opening 25, but are transported upwards by the counterflow 32 at least in the middle of the cross-section of the granulate de-dusting container 9 until the flow velocity in this air flow is no longer sufficient, due to the widening of this counterflow 32, to raise the granulate grains 4 carried in it further or even to maintain them in this raised state.

Below the granulate outlet opening 25 and thus below the dedusting container 9 is the intermediate container 14, which is also mostly an upright cylinder. This intermediate container 14 is often placed on the top of a consumer 50, such as an injection moulding machine, which is only indicated in FIG. 1a, and serves as an intermediate storage from which—when the lower opening of the intermediate container 14 is open—the granulate 4 is fed to the consumer 50.

After this dedusting of the granulate has been carried out for a sufficient period of time, it is terminated so that, according to FIG. 4, the now dedusted granulate batch 4' accumulates again in the lower area of the dedusting container 9, in particular in the area of the outlet cone 28.

As soon as the level in the intermediate container 14 has been reduced to such an extent that, for example, the upper side of the bulk material has reached the lower granulate outlet opening 25, as shown in FIG. 5, as a result of consumption of granulate 4 by the consumer 50, a batch of 4' of granulate 4 can again be introduced into the dedusting container 9 and be dedusted, as explained above in FIGS. 2 and 3.

In practice, a new batch of 4' is filled as soon as the level sensor 19 can no longer detect a level at its height and a specified waiting time has elapsed since then. This eliminates the need for an additional level sensor.

Preferably, however, before introducing a new batch 4', the now empty dedusting container 9 is first freed of the dust 11 deposited mainly on the inside of its walls, as shown in FIG. 6.

For this purpose, the dedusting container 9 is flushed with ionized air 34, preferably with a multiple of the volume of the dedusting container 9, i.e. via the air inlet opening 36, which is preceded by an ionizer 37, ionized air 34 is introduced and sucked off via the negative pressure prevailing in the exhaust air pipe 20.

A pressure control valve 29 may be provided in each of the compressed air lines 26 from control 22 to the respective air inlet opening 36.

All described processes are controlled by a central control 22:

This supplies compressed air via compressed air lines 26 controlled with regard to pressure and/or quantity and/or time.

the at least one ejector compressed air nozzle 21a in the at least one suction lance 16,
   the air inlet opening 36,
   the optionally available at least one ejector compressed air nozzle 21b for generating negative pressure in the dust pipe 20.

In addition, the control system is connected via electric cables 13 with all existing filling level sensors 19a, b at the dedusting container 9 and at the intermediate container 14 in a signal-technical connection in order to terminate the filling process at the right time, for example, depending on their measurement signals.

In addition, the ionizer 37 is also supplied with electrical current and controlled by the control 22.

In order to achieve such a filling level in the intermediate container 14, which supports the next batch 4' introduced into the dedusting container 9 during batchwise operation, this intermediate container 14 must first be filled at the beginning of the entire dedusting process, as shown in FIGS. 1a, b:

By activating the ejector compressed air nozzle 21a in the suction lance 16, granulate 4 is introduced into the dedusting container 9 via the granulate inlet opening 8, while at the same time both the ejector compressed air nozzle 21b in the exhaust air pipe 20 generates vacuum and compressed air is injected via the whirling nozzles 31 and an upwardly directed counterflow 32 is generated against the falling direction of the granulate grains 4.

This means that the granulate grains 4 falling down from the inlet stub 24 are partially de-dusted on their way down to the granulate outlet opening 25.

Depending on the setting of the pressure and/or volume flow through the whirling nozzles 31, i.e. depending on the force of the counterflow 32, a larger or smaller part of the granulate grains 4 falling out of the inlet stub 24 will not immediately fall through the granule outlet opening 25, but will first be whirled up once or twice and thus better de-dusted before they fall downwards into the intermediate container 14.

The force of the counterflow 32 can thus be set depending on the desired dedusting quality and/or depending on the amount of granulate 4 consumed by the consumer 50 per time unit.

For batchwise operation, the aim is to raise the filling level in the intermediate container 14 to the level of the granulate outlet 25 of the dedusting container 9 as shown in FIG. 1b, in order to then be able to start dedusting batchwise, whereby the filling level should preferably be at this level again after dedusting a batch of 4". However, the consumption of granulate 4 cannot normally be influenced by the downstream consumer, and this aim can only be achieved by analogous feeding of granulate into the dedusting container 9 and dedusting of granulate.

However, continuous operation with this device can also be carried out in this way by adjusting the counterflow 32 and also the—preferably continuous—filling of granulate into the dedusting container 9 in such a way that the surface of the granulate filling 4 in the intermediate container 14 never reaches its lower end, but preferably does not rise above the granulate outlet opening 25 of the dedusting container 9.

REFERENCE SIGN LIST 1 dedusting device
2 exhaust air filter
3 conveying air
4 granulate, granulate filling, granulate grain
4' batch
5 screen
6 exhaust air
7 storage container
8 granulate inlet opening
9 dedusting container
10 direction of flow
11 dust
12 dust-collection container
13 electric cable
14 intermediate container
15 conveyer pipe
16 suction lance
17 compressed air source
18 air outlet opening
19 level sensor
20 dust pipe
21a, b ejector compressed air nozzle, vacuum generator
22 control
23
24 inlet stub
25 granulate outlet opening
26 compressed air line
27 lid
28 outlet cone
28' cone surface
29 pressure control valve
30 reverse zone
31 whirling nozzle
32 counterflow
33 ring channel
34 ionized gas
36 gas supply port
37 ionizer
50 consumer

The invention claimed is:

1. A device (1) for batchwise dedusting a granulate (4), having a conveying flow generator arranged upstream of a dedusting container (9) in the form of an ejector compressed air nozzle (21a) with a compressed air connection and the dedusting container (9) comprising:
at least one granulate inlet opening (8) for the granulate (4),
a granulate outlet opening (25) in a lower part of the dedusting container (9) in its base,
an air outlet opening (18) which is arranged in an upper part of the dedusting container (9),
an ionizer (37),
a whirling unit for whirling up the granulate (4) in the dedusting container (9),
a controller (22) capable of controlling the whirling unit and the ionizer,
wherein
an intermediate container (14) is arranged below the granulate outlet opening (25) at an underside of the dedusting container (9), into which dedusted granulate can fall through the granulate outlet opening,
the device comprises a level sensor in the intermediate container which is connected to the controller (22),
the granulate outlet opening (25) is permanently open, wherein the device has no closure element as part of the device that is capable of closing the granulate outlet opening,
peripheral walls surrounding the dedusting container (9) consist of an electrically non-conductive material at least on inner surfaces facing the interior,
the whirling unit has upwardly directed whirling nozzles (31), which are connected to a compressed air connection, in the lower part of the dedusting container (9), in the granulate outlet opening (25),
wherein, if a level in the intermediate container (14) measured by the level sensor rises up to a level of the granulate outlet opening (25) of the dedusting container (9), the controller (22) initiates the batchwise dedusting, wherein the lower granulate outlet opening (25) is not closed by a closure element of the device during a filling process of the dedusting container with the granulate (4).

2. The device according to claim 1, wherein
a cross-section of the dedusting container (9) decreases in the lower part towards the granulate outlet opening (25) in the form of a cone surface (28'), and
the whirling nozzles (31) are arranged in the cone surface (28').

3. The device according to claim 1, wherein
the whirling nozzles (31) are controllable with respect to pressure or flow velocity or volume flow, are controllable by the controller (22).

4. The device according to claim 1, wherein
the ionizer (37) comprises an ionizing tip which is arranged in a free end region of an air supply line and projects into a gas inlet opening (36) in the wall of the dedusting container (9) or even into the interior of the dedusting container (9).

5. The device according to claim 1, wherein
a gas inlet opening (36) with the ioniser (37) connected thereto
is arranged either in the lower region of the dedusting container (9), above an outlet cone (28), or in the outlet cone (28), in or at a gas supply port (36), or
below the granulate outlet opening (25) in an intermediate container (14), in its upper region.

6. The device according to claim 1, wherein
the air outlet opening (18) is permanent and completely open, in particular is not covered by a screen (5).

7. The device according to claim 1, wherein
the height of the dedusting container (9) is at least 100 mm.

8. The device according to claim 1, wherein
the peripheral wall of the dedusting container (9) is an upright glass tube which is open at the top and bottom, having a rotationally symmetrical cross-section, and the cross-section is unchanged over the entire length.

9. The device according to claim 1, wherein
the device comprises a dust separator, in particular an exhaust air filter (2), or a vacuum generator, in particular an ejector compressed air nozzle (21b), which is arranged downstream of the dedusting container (9).

10. The device according to claim 1, wherein
the granulate inlet opening (8) is arranged in an upper half of the height of the dedusting container (9).

11. The device according to claim 1, wherein
the whirling nozzles (31) are capable of generating an upwardly directed counterflow (32) such that the granulate (4) thereby whirled up stop their upward movement mainly due to gravity before they reach the upper air outlet opening (18).

12. The device according to claim 1, wherein
the dedusting container (9) has one or more granulate inlet openings (8), each of which is connected via a conveyer pipe (15) to a suction lance (16) in which the ejector compressed air nozzle (21a) is arranged,
or
the dedusting container (9) has only one granulate inlet opening (8), the conveyer pipe (15) of which has outside the dedusting container (9) a branch to one or more suction lances (16), in each of which the ejector compressed air nozzle (21a) is arranged.

13. A method for removing dust from a granulate (4) by means of a device according to claim 1 whereby the dust (11) adhering to the granulate grains (4) is to be removed, and wherein for batchwise operation
with or without counterflow (32), granulate (4) is filled into the dedusting container (9) up to a predetermined filling level,
the filling process is terminated when the filling level is reached,
the dedusting of the filled batch (4') in the dedusting container (9) is carried out by means of introduced ionized air, and whirling up the granule grains (4) by means of a counterflow (32) and conveying out, dust-laden gas,
the dedusting container (9) is cleaned by flushing with an ionised gas, in particular ionised air,
after the filling level has fallen below the specified level, the previous steps can be carried out again.

14. The method according to claim 13, wherein
in batchwise operation
the counterflow (32) is adjusted by controlling the whirling nozzles (31) with respect to pressure and/or flow velocity and/or volume flow,
or
the counterflow (32) is effected by, in particular only by, the ionized gas introduced in the lower region of the dedusting container (9).

15. The method according to claim 13, wherein
sucking out the dust-laden gas from the dedusting container (9) and the introduction of air via the whirling nozzles (31) is carried out simultaneously.

16. The method according to claim 13, wherein
the granulate (4) are whirled up several times in succession.

17. The method according to claim 13, wherein
the majority of the granulate (4) do not reach an upper air outlet opening (18), in particular also an inlet stub (24).

18. The method according to claim 13, wherein
the granulate outlet opening (25) is not closed in any operating state by a closure element attached to the device.

19. The method according to claim 13, wherein
after the filling level has dropped, the filling process is only started after a specified time delay.

20. The method according to claim 13, wherein
the height of a reverse zone (30), up to which the granulate (4) is swirled up, can be adjusted by the force of the counterflow (32).

21. The method according to claim 13, wherein
flushing is only started after dedusting has been completed, in particular after the filling level has dropped below the specified level.

22. The method according to claim 13,
  wherein a multiple volume of the total dedusting container (9) of the ionized gas (34) is introduced during flushing,
or
  the ionized gas (34), which is meanwhile at least partly no longer ionised, is continuously removed from the dedusting container (9) by suctioning out.

23. The method according to claim 13,
wherein
a counterflow (32) is terminated or at least reduced to such an extent that the granulate (4) located in the dedusting container (9) falls out downwards through the granulate outlet opening (25) after dedusting a granulate charge (4').

24. The method according to claim 13,
wherein
  the granulate (4) is transported by compressed air to the dedusting container (9)
or
  the dust (11) is removed from the dedusting container (9) by means of suction air.

25. The method according to claim 13,
wherein
the ionizing tip of the ionizer (37) is circulated around by a gas, in particular air, which is to be introduced into the dedusting container (9).

26. The method according to claim 13,
wherein
ionised gas is supplied
  in the lower region of the dedusting container (9), above the outlet cone (28) or through the outlet cone (28)
or
  below the granulate outlet opening (25) into the intermediate container (14).

* * * * *